Sept. 20, 1955     J. W. WATSON     2,718,394
LEAF SPRING SPACING STRUCTURES AND ANCHORAGES THEREFOR
Filed April 14, 1950
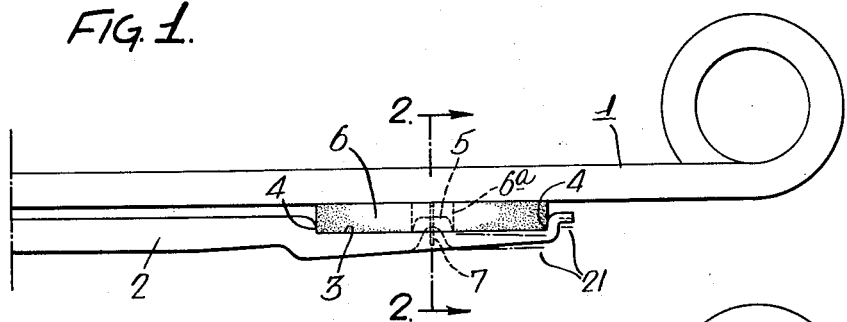
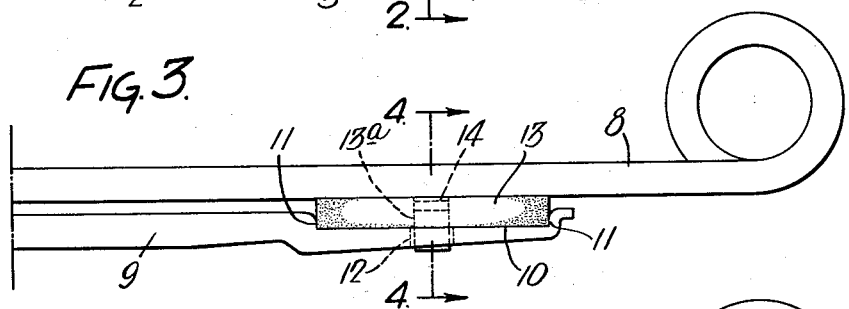
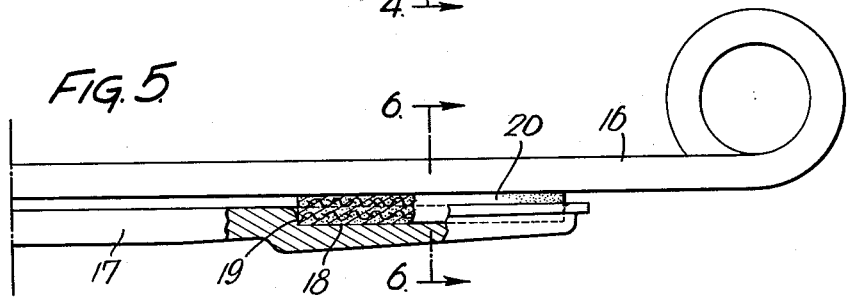
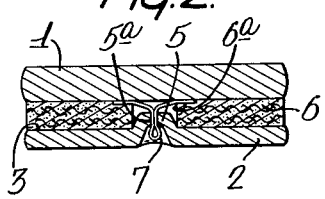
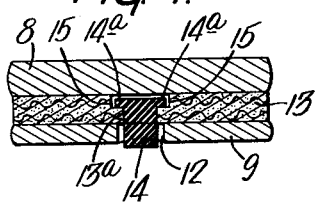
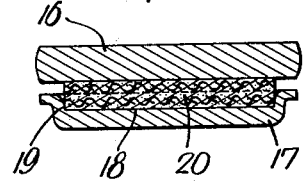
Inventor:
John Warren Watson
by his Attorneys
Howson & Howson

United States Patent Office 2,718,394
Patented Sept. 20, 1955

2,718,394

LEAF SPRING SPACING STRUCTURES AND ANCHORAGES THEREFOR

John Warren Watson, Wayne, Pa.

Application April 14, 1950, Serial No. 155,916

1 Claim. (Cl. 267—49)

This invention relates to anchoring means for maintaining a leaf-end friction bearing structure in predetermined position between two adjacent leaves of a leaf spring while in service.

A particular object of my invention is to provide anchoring means for a leaf-end friction bearing structure which is adapted for use in connection with all types of vehicles employing leaf springs and which is particularly adapted for use in connection with vehicles doing rugged duty such as intercity and urban buses, trucks, railway cars, etc.

A further particular object of my invention is to provide anchoring means in connection with the above which is particularly rugged and which is practically immune to failure from any cause.

Other objects and advantages of the invention will be made apparent from the accompanying drawings, in which:

Figure 1 is a fragmentary side elevational view of two leaves of a leaf spring spaced by a leaf-end friction bearing structure showing one form of my novel anchoring means;

Figure 2 is a cross sectional view on line 2—2, Fig. 1;

Figure 3 is a fragmentary side elevational view of two leaves of a leaf spring spaced by a leaf-end friction bearing structure and showing an alternate form of anchoring means and bearing structure;

Figure 4 is a cross sectional view on line 4—4, Fig. 3;

Figure 5 is a fragmentary side elevational view, partly in section, showing two leaves of a leaf spring and a second alternate form of anchoring means and bearing structure;

Figure 6 is a cross sectional view on line 6—6, Fig. 5;

Figure 7 is a fragmentary worm's eye view of Fig. 4 showing the relationship between the square shaped stem portion of the anchor member and the round hole in the leaf.

Referring to Figures 1 and 2, numeral 1 designates one of two adjacent leaves of a leaf spring; 2 designates the other of said leaves which is formed to present an open-sided depressed portion comprising a flat bottom portion 3 and wall portions 4 and an integral preferably round lug 5 in the center thereof; 6 designates a leaf-end friction bearing structure; 6a designates a preferably round central hole in bearing structure 6; 7 designates a fine wire cotter pin penetrating hole 5a in lug 5 and bent open and into mesh with bearing structure 6. The dotted lines 21 shown in Figure 1 designate a condition which will be referred to later in the application.

Referring to Figures 3 and 4, 8 designates one of two adjacent leaves of a leaf spring; 9 designates the other of said leaves which is formed to present an open-sided depressed portion comprising a flat bottom portion 10 and wall portions 11 and a preferably round central hole 12; 13 designates a leaf-end friction bearing structure; 13a designates a preferably square central hole in bearing structure 13; 14 designates an anchor member preferably of soft rubber in meshed engagement with holes 12 and 13a and having oppositely disposed flange means 14a residing in hole recesses 15 and acting to retain the anchor member in correct vertical working position with relation to the holes.

Referring to Figures 5 and 6, 16 designates one of two adjacent leaves of a leaf spring; 17 designates the other of said leaves which is formed to present an enclosed depressed portion comprising a flat bottom portion 18 and a continuous wall portion 19; 20 designates a leaf-end friction bearing structure.

It will be apparent that the open-sided depressed portions shown in Figs. 1 and 3 will provide leaf-end flexibility comparable to that provided by a conventional taper rolled leaf end. It will be apparent also that the enclosed or box type depression shown in Fig. 5 will not provide such flexibility. Greater flexibility, however, may here be had by providing one or more breaks in each of the side walls. One or more of such breaks would also serve to drain out any water which might accumulate in this compartment.

In addition to the simplicity and ruggedness of the bearing structures and anchorage methods here illustrated and described, a further marked advantage lies in the fact that the anchorage means remains completely intact during all of the time it will take to wear the bearing structure down to the point where the two leaves come in contact with each other. If the bearing structures are made of a material exhibiting frictional properties whereof the static and dynamic coefficients of friction are in fine balance, and they should be so constructed, the life of the bearing structure with this method of anchoring will prove to be greatly extended. For this duty my preference would be a bearing structure of textile fabric impregnated throughout and coated with a compound such for example as disclosed in U. S. Patent 1,845,096, exhibiting the fine balance between static and dynamic coefficients of friction above referred to.

Many different forms of lateral anchorage means may, of course, be substituted for those shown in Figs. 1 and 3. Some such pliable or readily renewable form of retainer means as shown here by numeral 7 in Fig. 1 may be employed if desired by providing a small hole in the depression and bearing structure shown in Figs. 3 or 5. In scope also this feature of my invention extends generally to retainer means for use in connection with any other type of leaf-end bearing structure or anchoring means.

As shown in Figures 1, 3 and 5, the bottom of the recess is seen to be flat. If desired, however, the bottom may be formed to bend downwardly about three-sixty-fourths of an inch from its center to its tip end as indicated by dotted lines 21 in Fig. 1. Such bending would closely conform to the curvature of the upper leaf over this area when under load. By thus avoiding initial concentration of the load against the leading edge of the bearing structure, a condition which almost always initiates bearing structure failure, greatly increased mileage from the bearing structure may be had.

I claim:

In combination, two immediately adjacent leaves of a leaf spring and which leaves are of unequal length, a leaf-end friction bearing structure positioned between said leaves for damping relative movements thereof and having a coefficient of rigidity, shearwise, to produce, by sliding surface-friction between said bearing structure and one or both of said leaves, resistance to such movements from the inception thereof and presenting to at least the longer of said leaves a surface of sufficient yieldability to conform to irregularities thereof and frictional properties whereof the static and dynamic coefficients of friction are sufficiently in balance to avoid setting up destructive spasmodic actions and/or objectionable noise-producing vibrations, the shorter of said leaves adjacent an end thereof having an approximately flat depressed floor portion the transverse dimension of which being substantially that of said shorter leaf and said floor portion having, fore and aft thereof, effectively feasibly abrupt wall portions for limiting longitudinal and turning movements of said bearing structure with relation to said shorter leaf and, for limiting lateral movements of said bearing structure with relation to said shorter leaf, anchoring means comprising a projection integral with said floor portion and extending upwardly thereof and into meshed engagement with a hole provided in said bearing structure.

References Cited in the file of this patent

UNITED STATES PATENTS

| | | |
|---|---|---|
| 2,199,381 | Weber | May 7, 1940 |
| 2,227,300 | Dow | Dec. 31, 1940 |
| 2,270,516 | Dow | Jan. 20, 1942 |
| 2,280,201 | Thompson | Apr. 21, 1942 |
| 2,355,801 | Hildenbrand | Aug. 15, 1944 |